Feb. 28, 1961     H. BRICOUT     2,973,058
METERING DISTRIBUTORS OF TWO-LINE
CENTRAL LUBRICATION SYSTEMS
Filed March 21, 1960
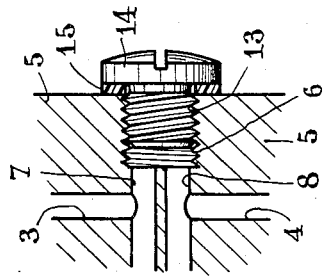
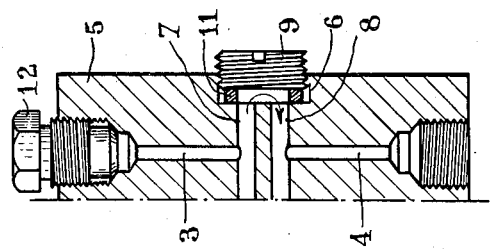
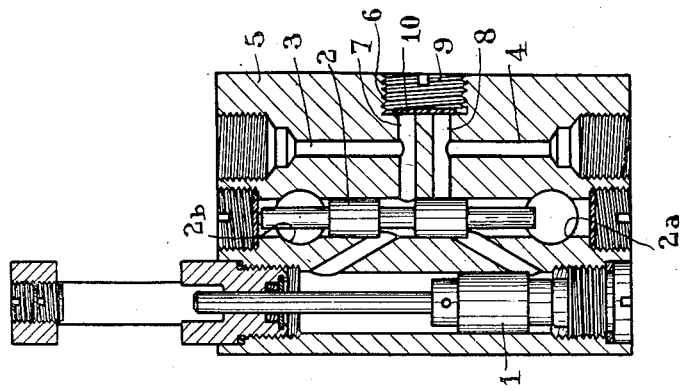
Inventor:
Henri Bricout
By Ernest A. Montague
Attorney United States Patent Office 2,973,058
Patented Feb. 28, 1961

2,973,058
METERING DISTRIBUTORS OF TWO-LINE CENTRAL LUBRICATION SYSTEMS

Henri Bricout, Meudon, France, assignor to Etablissements Georges Martin, Levallois-Perret (Seine), France, a corporation Filed Mar. 21, 1960, Ser. No. 16,433

Claims priority, application France Mar. 26, 1959

3 Claims. (Cl. 184—7)

The present invention relates to metering distributors of two-line central lubrication systems having one or two outlets.

It is known that these devices comprise a metering piston and one or two slide valves constituting the distributor members controlling the communication between that line of the two which is under pressure, with one end of the cylinder in which the metering cylinder is slidably fitted, as well as the simultaneous connection between the other end of this cylinder and the relevant outlet, and vice-versa. Thus, a metered quantity of lubricant is successively and alternately injected through each of the two outlet lines leading each to a specific lubricating point.

With a metering device of this character both lubricating points are alternately lubricated. Now it is frequently necessary to supply a greater quantity of lubricant to predetermined points, or to feed isolated points, and in this case single-outlet metering devices or distributors are necessary. This requirement may be met by so modifying an existing metering device as to close one of its outlets and maintain only one of them in operation, this single operating outlet being fed during each displacement of the metering piston, the two outlet ducts of the cylinder in which the metering pistons is fitted being interconnected to this end.

However, this possibility of establishing a communication between the two ducts as in the case set forth in the preceding paragraph is subordinate to a specific machining of the body of the metering or distributor device. This delicate transformation requires many cares as well as the disassembly of the piston unit and other components of the device. Therefore, it cannot be considered as a simple matter for ordinary or unskilled users. Under these conditions, manufacturers must either have a double stock of devices, comprising one series of standard, two-outlet devices, and another series of converted, single-outlet devices, unless he chooses the solution consisting in stocking the bodies of the devices without their component elements with a view to permit their transformation prior to any assembly operation according to requirements.

It is the essential object of this invention to avoid these drawbacks by facilitating the transformation of a two-line central-lubrication metering device or distributor, whereby this transformation may be effected in a practically instantaneous manner without any machining of parts and possibly by the users themselves, even if the metering device is already mounted and in operation.

To this end this invention provides a two-line central lubrication metering device or distributor characterized in that its body comprises a cylindrical chamber opening to the outside and having a bottom into which lead two branch passages from each duct feeding the two outlets, and that there is provided in combination at least one threaded plug adapted to be screwed in this chamber for either obturating both branch passages so as to maintain the two outlets independent of each other, or permitting the communication between these two branch passages and therefore transforming the device into a single-outlet metering device or distributor, the other outlet being obturated by a separate plug.

According to a preferred form of embodiment of this invention, there is provided a single threaded plug and, according to circumstances, there is interposed between this plug and the bottom of the aforesaid chamber either a solid disk for obturating the outlet orifices of both branch passages or an annular, relatively thick gasket or washer permitting the communication between these two outlet orifices. Thus, in either case, the degree of sinking of the threaded plug constitutes a visual indication as to the type of operation for which the device has been set.

With the foregoing and other objects in view, the invention resides in the novel arrangement and combination of parts and in the constructional details hereinafter described and claimed, it being understood that changes in the precise embodiment of the invention herein disclosed may be made within the scope of what is claimed without departing from the spirit of the invention. Other objects and advantages will become apparent from the following description taken in conjunction with the accompanying drawing in which:

Figure 1 is a longitudinal section showing a two-line central lubrication system metering distributor prepared for two-outlet operation;

Figure 2 shows one portion of Fig. 1, wherein the device is prepared for single-outlet operation, and Figure 3 is a sectional view showing a modified embodiment of the device shown in Figs. 1 and 2.

The body 5 of the metering device or distributor illustrated in the drawing has slidably fitted therein a metering piston 1 and a distributor slide valve 2. This body comprises two inlets 2a, 2b connected to the control lines from the pump delivery side, these inlets opening into the slide-valve bore. It also comprises ducts 3 and 4 for supplying lubricant to both outlets respectively.

According to this invention, there is formed in the body 5 of the distributor a cylindrical chamber 6 (Fig. 2) having a tapped wall and in its bottom two passages 7, 8 constituting the outlet branches of the aforesaid ducts 3, 4 respectively. A threaded plug 9 is screwed in the chamber 6, as shown.

When it is desired to feed both outlets (Fig. 1), a solid disk or washer 10 is interposed between this plug and the bottom of chamber 6. Thus, the disk will obturate the outlet orifices of both branch passages 7, 8, and consequently the two outlet lines will be separated from each other and supplied by turn with lubricant, in the usual way.

When it is desired to operate the device as a single-line distributor (Fig. 2) an annular gasket or washer 11 is simply substituted for the solid disk 10, this gasket or washer 11 having a thickness sufficient to free one portion of chamber 6 and thus permit the communication between either of the branch passages 7, 8 and therefore with the outlet ducts 3, 4. In this case, the line to be left idle will be obturated by means of a plug 12.

The plug 9, according as it is more or less sunk into the body 5, constitutes a visual indicator as to the type of operation for which the device has been set. As a matter of fact, the length of this plug 9 is such that its outer face is flush with the outer wall of the metering device in one case (Fig. 1) and projects slightly from this wall in the other case (Fig. 2), the annular gasket or washer 11 being thicker than the disk 10. Thus, the user or fitter will be readily informed of the exact type to which each metering device pertains, that is, whether it is a two-line or single-line device. The reverse arrangement would on the other hand be equivalent in this respect: recessed or sunk plug in the case of Fig. 1 and flush plug in the case of Fig. 2.

According to a modified embodiment of this invention, there are provided in combination two separate plugs for closing the aperture of chamber 6. In this case the first plug is a solid plug of the type shown at 9 which is utilized for obturating both branch passages 7 and 8 (Fig. 1).

The other plug contemplated in this alternate embodiment is a threaded plug 13 provided with a head 14 engaging the outer wall of the body of the distributor, a sealing gasket 15 being interposed between this head and the body 5. By construction, this plug is relatively short in order to leave a free portion in chamber 6 and permit the desired communication between the branch passages 7 and 8 (Fig. 3).

As will be readily understood, the metering device of this invention may be easily transformed, without resorting to any machining step, in a practically instantaneous manner. It may be noted that this transformation is reversible in that a device converted into a single-line or single-outlet metering distributor may be reconverted with the same facility into a two-line or double-outlet metering distributor by substituting a disk 10 for the gasket 11.

Although the present invention has been described in conjunction with two preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim as new is:

1. In a central lubrication system comprising two feed lines and a lubricant metering distributor of the type consisting of a body formed on the one hand with two cylindrical bores receiving the one a metering piston and the other a distributor slide-valve, and on the other hand with a pair of outlets connected to said feed lines respectively and to said slide-valve bore through branch passages, a chamber having tapped side walls formed in said body, said branch passage opening into the bottom of said chamber, a solid disk in the bottom of said chamber and a screw plug fitting in said chamber and adapted to press said disk against the outlet orifices of said branch passages in said chamber.

2. In a central lubrication system comprising two feed lines and a lubricant metering distributor of the type consisting of a body formed on the one hand with two cylindrical bores receiving the one a metering piston and the other a distributor slide-valve, and on the other hand a pair of outlets connected to said feed lines respectively and to said slide-valve bore through separate branch passages, a chamber having tapped side walls formed in said body, said branch passages opening into the bottom of said chamber, a relatively thick annular gasket in the bottom of said chamber, a screw plug fitting in said chamber and adapted to press said annular washer against the bottom of said chamber, and another plug fitting in that outlet of said body which is to be obturated for operating the device in a single-line system.

3. In a central lubrication system comprising two feed lines and a lubricant metering distributor of the type consisting of a body formed on the one hand with two cylindrical bores receiving the one a metering piston and the other a distributor slide-valve, and on the other hand a pair of outlets connected to said feed lines respectively and to said slide-valve bore through branch passages, a chamber having tapped side walls formed in said body, said branch passages opening into the bottom of said chamber two separate, screw plugs fitting in said chamber, one plug being headless and adapted to obturate both of said branch passages, the other plug being formed with a head engaging the outer face of the relevant wall of said body, the shank portion of said plug being relatively short to constitute a passage permitting the communication in said chamber between said branch passages, and a gasket interposed between said head and said wall.

References Cited in the file of this patent

UNITED STATES PATENTS

| | | |
|---|---|---|
| 1,958,187 | Dirikes | May 8, 1934 |
| 2,626,014 | Schmid | Jan. 20, 1953 |
| 2,667,236 | Graves | Jan. 26, 1954 |